United States Patent
Chen

(10) Patent No.: US 11,565,734 B2
(45) Date of Patent: Jan. 31, 2023

(54) WEAK-CURRENT UNIFIED SYSTEM FOR RAIL TRANSIT

(71) Applicant: BYD COMPANY LIMITED, Guangdong (CN)

(72) Inventor: Guofang Chen, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 206 days.

(21) Appl. No.: 16/960,281

(22) PCT Filed: Jan. 4, 2019

(86) PCT No.: PCT/CN2019/070464
§ 371 (c)(1),
(2) Date: Jul. 6, 2020

(87) PCT Pub. No.: WO2019/137312
PCT Pub. Date: Jul. 18, 2019

(65) Prior Publication Data
US 2021/0070333 A1    Mar. 11, 2021

(30) Foreign Application Priority Data
Jan. 9, 2018 (CN) .......................... 201810018874.8

(51) Int. Cl.
H04L 12/24     (2006.01)
H04L 41/0803   (2022.01)
(Continued)

(52) U.S. Cl.
CPC .............. B61L 27/70 (2022.01); B61L 27/40 (2022.01); H04L 67/12 (2013.01)

(58) Field of Classification Search
CPC .......... B61L 27/70; B61L 27/40; H04L 67/12; H04L 67/125; G06Q 50/30; G08G 1/00
(Continued)

(56) References Cited

U.S. PATENT DOCUMENTS 6,032,905 A      3/2000  Haynie
2016/0092180 A1*  3/2016  Straub .................. G06T 1/0007
                                                 715/762
(Continued)

FOREIGN PATENT DOCUMENTS

CN   101927777 B  *  3/2012  ............. B61L 23/00
CN   203005471 U     6/2013
(Continued)

OTHER PUBLICATIONS

MEM-V- (Chen, Guofang et al.). "WA3-66.fiFL—#4-LRAY'll-0,366. 1147gilltg-14 (Non-official translation: Urban Rail Traffic Weak Electricity Integration and Application Discussion thereof in Cross-saddle Single-track Traffic)" gi4hg/,/-R (Non-official translation: Railway Technical Innovation), No. 6, Dec. 30, 2018 (Dec. 30, 2018), ISSN: 1672-061X, pp. 51-54 and 60.
(Continued)

*Primary Examiner* — Yves Dalencourt
*Assistant Examiner* — Elizabeth Kassa
(74) *Attorney, Agent, or Firm* — Calfee Halter & Griswold LLP

(57) ABSTRACT

The present disclosure provides a weak-current unified system for rail transit. The weak-current unified system for rail transit is constructed in a cloud and end mode, and a weak-current unified cloud platform is communicatively connected to field devices of professional systems, so that the field devices of the professional systems are managed and controlled in a unified manner.

12 Claims, 5 Drawing Sheets

(51) Int. Cl.
*B61L 27/70* (2022.01)
*H04L 67/12* (2022.01)
*B61L 27/40* (2022.01)

(58) Field of Classification Search
USPC .............................................................. 246/1
See application file for complete search history.

(56) References Cited

U.S. PATENT DOCUMENTS

| | | | |
|---|---|---|---|
| 2016/0221592 A1* | 8/2016 | Puttagunta | B61L 25/025 |
| 2016/0381066 A1* | 12/2016 | Galula | H04L 63/1441 |
| | | | 726/23 |
| 2017/0031356 A1* | 2/2017 | Bell | B61L 27/02 |
| 2017/0334473 A1* | 11/2017 | Ghaly | B61L 27/04 |
| 2018/0006913 A1 | 1/2018 | Jianhua | |
| 2018/0041515 A1* | 2/2018 | Gupta | H04L 63/0815 |

FOREIGN PATENT DOCUMENTS

| | | | | |
|---|---|---|---|---|
| CN | 103264717 | A | 8/2013 | |
| CN | 104320486 | A | 1/2015 | |
| CN | 104386095 | A | 3/2015 | |
| CN | 104680782 | A | 6/2015 | |
| CN | 105023425 | A | 11/2015 | |
| CN | 105681115 | A | 6/2016 | |
| CN | 104680782 | B | 5/2017 | |
| CN | 107197028 | A | 9/2017 | |
| CN | 107241397 | A | 10/2017 | |
| CN | 206537292 | U | 10/2017 | |
| CN | 107370786 | A | 11/2017 | |
| CN | 109905429 | A * | 6/2019 | H04L 29/08 |

OTHER PUBLICATIONS

Search Report for International Application No. PCT/CN2019/070464 dated Apr. 1, 2019.

* cited by examiner

WEAK-CURRENT UNIFIED SYSTEM FOR RAIL TRANSIT

CROSS-REFERENCE TO RELATED APPLICATIONS

This application is the National Stage of International Application No. PCT/CN2019/070464, filed on Jan. 4, 2019, which claims to the priority of Chinese Patent Application No "201810018874.8" filed by the BYD Co., Ltd. on Jan. 9, 2018 and entitled "WEAK-CURRENT UNIFIED SYSTEM FOR RAIL TRANSIT", which are incorporated by reference in their entireties.

FIELD

The present disclosure relates to the field of electronic information technologies, and in particular, to a weak-current unified system for rail transit.

BACKGROUND

In recent years, as the economy continues to develop, sizes of cities continue to expand, and more and more cities use rail transit as a main mode of travel for residents.

Generally, rail transit information systems include an automatic train supervision (ATS) system, an automatic fare collection (AFC) system, a passenger information system (PIS), an integrated supervisory control system (ISCS), an enterprise asset management (EAM), a training management system (TMS), and the like, which are used of rail transit operation command, passenger service, public safety guarantee, operation and maintenance management, and provides basic guarantee for passengers to travel safely, punctually, and quickly.

The inventor finds that most of the rail transit information systems in the related art are constructed in a mode of "by lines and specialities", and the AFC system, the ATS, and other professional systems for each line adopt a chimney-like architecture that is independently designed, implemented in stages, and gradually formed. In this construction method, a same professional system is repeatedly purchased for a plurality of lines, including software, hardware, and other resources, leading to high costs of the rail transit information systems. In addition, data of the lines and the professional systems cannot be interconnected due to architecture problems, and therefore a management decision maker cannot obtain real-time full-scale data of rail transit operation, which is not conducive to unified dispatching and control of rail transit.

SUMMARY

The present disclosure is intended to resolve at least one of the technical problems in the related art to some extent.

In view of the above, the present disclosure provides a weak-current unified system for rail transit. The weak-current unified system for rail transit is constructed in a cloud and end mode, and a weak-current unified cloud platform is communicatively connected to field devices of professional systems, so that the field devices of the professional systems are managed and controlled in a unified manner. In this way, data interconnection and software and hardware resource sharing between the professional subsystems can be implemented, a joint commissioning cycle of each subsystem is reduced, and a rail transit construction cycle and operating investment costs are reduced, thereby provides conditions for unified dispatching and control of rail transit.

Embodiments of the present disclosure provides a weak-current unified system for rail transit, including field devices of professional systems and a weak-current unified cloud platform, the weak-current unified cloud platform communicating with the field devices of the professional systems, and being configured to obtain operating data collected by the field devices of the professional systems, and perform at least one of calculation, storage, and transmission on the operating data to determine operating statuses of the professional systems of rail transit; and the weak-current unified cloud platform being further configured to deliver control instructions or files to the field devices of the professional systems to manage and control the professional systems of rail transit through the field devices of the professional systems.

In another possible implementation, the field devices of the professional systems include ground devices of the professional systems and vehicle on-board devices of the professional systems.

In another possible implementation, the weak-current unified cloud platform includes a software as a service (SaaS) layer, a business capability center, a middleware layer, and an infrastructure layer from top to bottom that are communicatively connected sequentially according to a technical architecture, where the infrastructure layer is configured to provide an infrastructure required for operation of the weak-current unified cloud platform; the middleware layer is configured to provide a middleware resource required for the operation of the weak-current unified cloud platform; the business capability center includes a plurality of capability assemblies for respectively implementing different businesses of the weak-current unified cloud platform; and the SaaS layer is configured to provide a professional system of rail transit for a user.

In another possible implementation, the SaaS layer includes a driving control platform, an integrated communication platform, a passenger service platform, and an integrated dispatching platform according to business types.

In another possible implementation, the SaaS layer further includes a production and operation platform and a training platform.

In another possible implementation, the driving control platform is configured to provide services for the operation and safety of rail transit, and includes a vehicle on-board signal subsystem, a driving control subsystem, and a full-electronic interlocking system, where the vehicle on-board signal subsystem bears an automatic train protection system and an automatic train operation system in a converged manner;

the driving control subsystem bears an ATS system; and the full-electronic interlocking system bears a zone controller and a computer interlocking system in a converged manner.

In another possible implementation, the integrated communication platform is configured to implement unified communication integration management, and includes a vehicle-ground wireless integrated bearing subsystem, a voice subsystem, a transmission system integrated bearer, and an integrated network management subsystem, where the vehicle-ground wireless integrated bearing subsystem is configured to bear vehicle-ground communication between a passenger information system, a closed-circuit television (CCTV) supervisory control system, and a vehicle on-board controller in an integrated manner through a wireless private network;

the voice subsystem is configured to bear voice communication between a dedicated telephone system, an orderwire telephone system, and a dedicated wireless system through a public network;

the transmission system integrated bearer is configured to implement unified network transmission and isolation of a communication system, a signal system, a weak-current subsystem; and the integrated network management subsystem is configured to reconstruct network management and centralized alarm systems of the professional systems, to implement unified control of the field devices of the professional systems.

In another possible implementation, the passenger service platform is configured to implement unified vehicle-ground information management and linkage sharing, and includes:

a passenger service subsystem and a vehicle on-board passenger service subsystem of a control center, configured to bear a passenger service information system, the CCTV supervisory control system, a wired broadcasting system, and an AFC system for urban rail transit.

In another possible implementation, the integrated dispatching platform is configured to reconstruct the CCTV supervisory control system, a fire alarm system, a device automation management system, a power supervisory control system, an access control system, a platform screen door system, and an ISCS, to implement integrated supervision and dispatching for the professional systems.

In another possible implementation, the production and operation platform is configured to reconstruct a traffic control center, a rail transit clearing center, a precompile control center, a signal maintenance support system, an enterprise asset management system, an office automation system, and a decision support system, to implement information management for rail transit.

In another possible implementation, the training platform is configured to reconstruct training subsystems of the professional systems to implement integrated training management for the professional systems.

In another possible implementation, the infrastructure layer includes a server resource, a storage resource, a network resource, and a power supply resource.

In another possible implementation, the middleware layer includes a business support layer and a data layer from top to bottom that are communicatively connected sequentially, the data layer being configured to provide a data storage service for the weak-current unified cloud platform; and the business support layer being configured to provide an Internet middleware resource for the weak-current unified cloud platform.

In another possible implementation, the plurality of capability assemblies of the business capability center include a user assembly, a passenger assembly, a line center assembly, a driving control center assembly, a ticketing assembly, an integrated supervisory control assembly, an alarm and fault assembly, a configuration management assembly, a device assembly, a resource assembly, a dispatching assembly, a repair and maintenance assembly, an operating assembly, a training assembly, a report assembly, an asset assembly, and a CCTV supervisory control assembly.

In another possible implementation, the business capability center is a distributed computing framework platform based on a microservice architecture.

According to the weak-current unified system for rail transit in the embodiments of the present disclosure, the weak-current unified system for rail transit is constructed in a cloud and end mode, and a weak-current unified cloud platform is communicatively connected to field devices of professional systems, so that the field devices of the professional systems are managed and controlled in a unified manner. In this way, data interconnection and software and hardware resource sharing between the professional subsystems can be implemented, a joint commissioning cycle of each subsystem is reduced, and a rail transit construction cycle and operating investment costs are reduced, thereby provides conditions for unified dispatching and control of rail transit.

BRIEF DESCRIPTION OF THE DRAWINGS

The foregoing and/or additional aspects and advantages of the present disclosure will become apparent and comprehensible in the description made with reference to the following accompanying drawings, where.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

Figure 1:
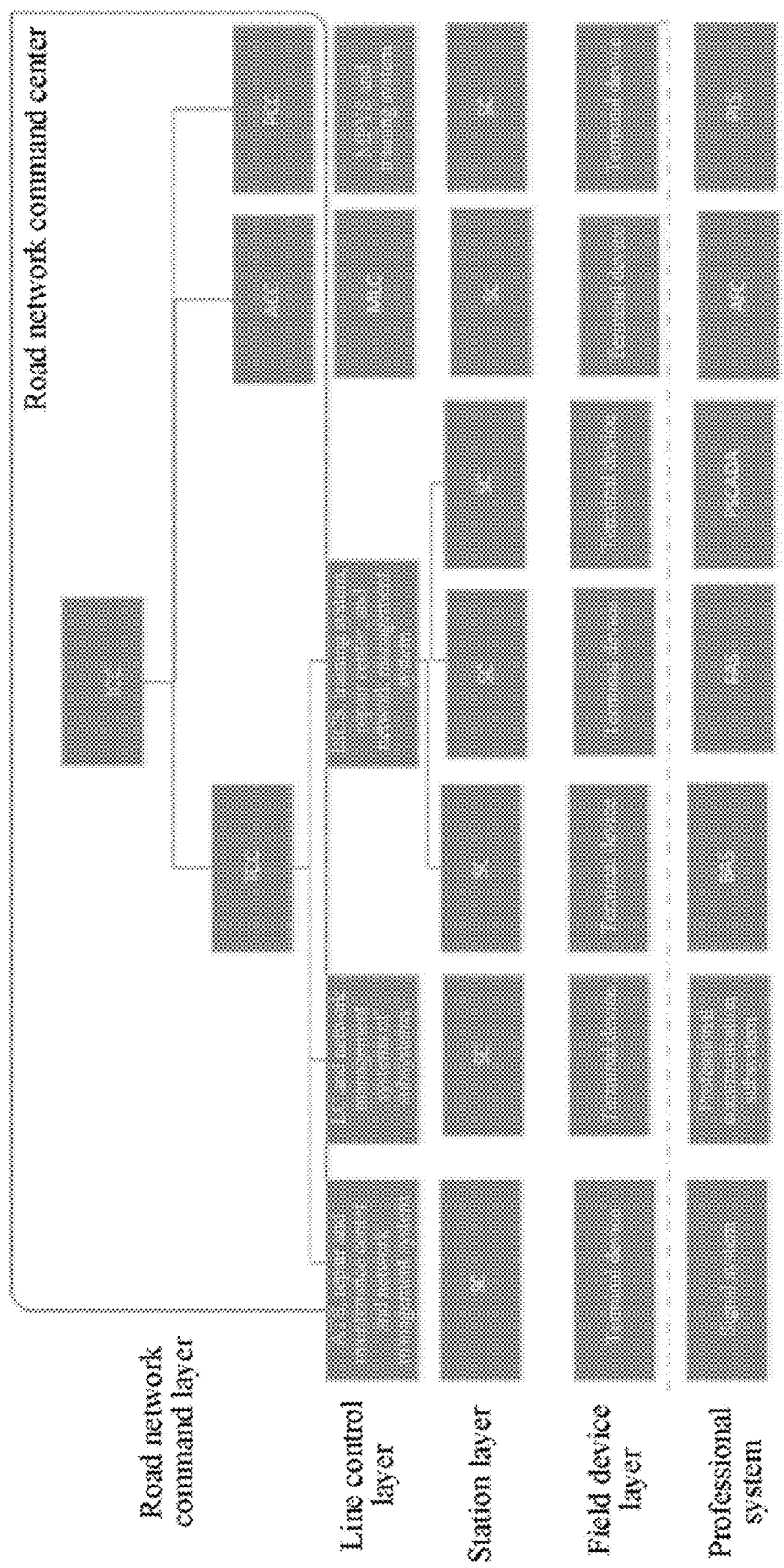
FIG. 1 is a schematic structural diagram of a weak-current unified system for rail transit in the related art.

It can be understood that when rail transit information systems in the related art are constructed in a mode of "by lines and specialities", as shown in FIG. 1, a field device layer, a station layer, a line control layer, a road network command layer are usually included. As shown in FIG. 1, an AFC system, an ATS, and other professional systems for each line adopt a chimney-like architecture that is independently designed, implemented in stages, and gradually formed. That is, the professional systems are independent of each other, and each includes a field device layer, a station layer, and a line control layer. In this construction method, a same professional system is repeatedly purchased for a plurality of lines, including software, hardware, and other resources, leading to high costs of the rail transit information systems. In addition, data of the lines and the professional systems cannot be interconnected due to architecture problems, and therefore a management decision maker cannot obtain real-time full-scale data of rail transit operation, which is not conducive to unified dispatching and control of rail transit.

Figure 2:
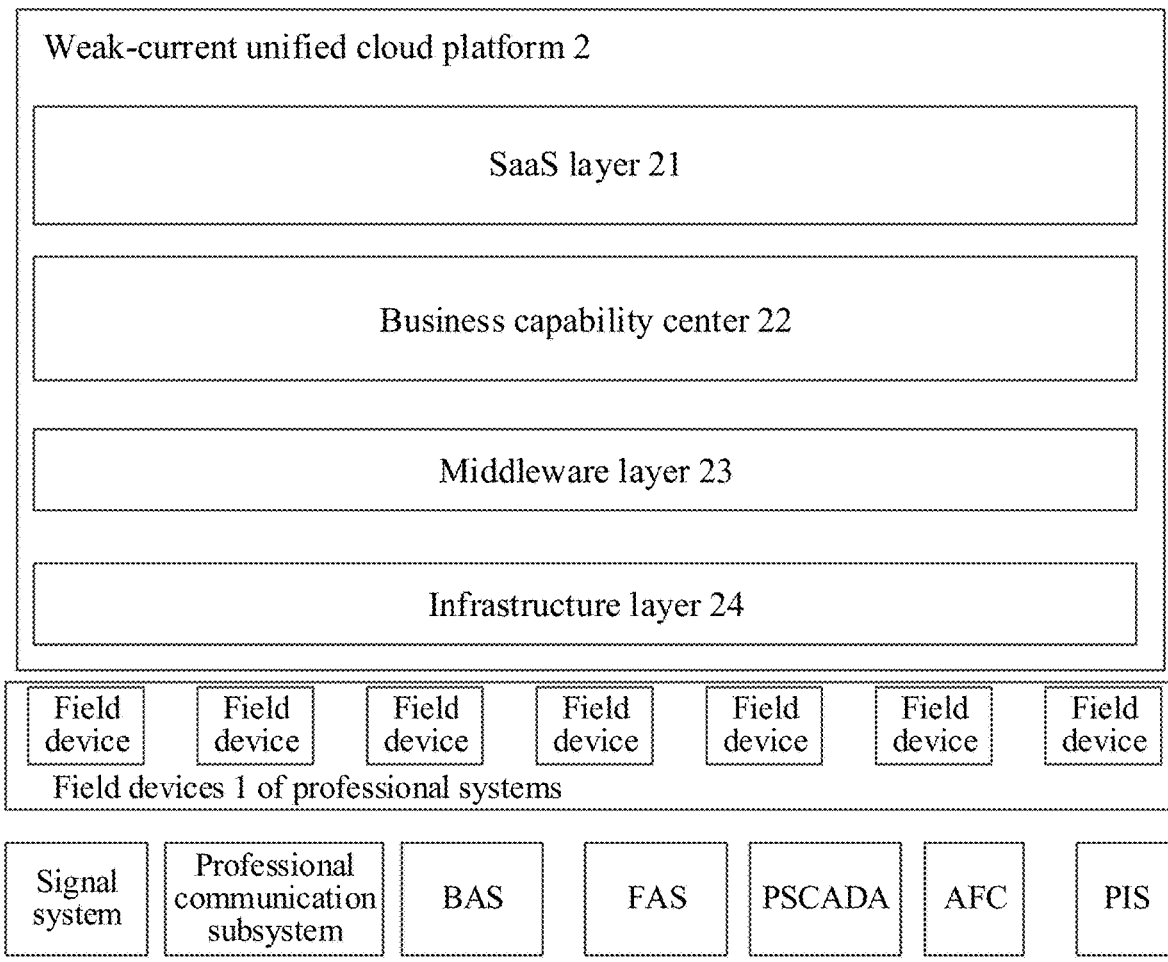
FIG. 2 is a schematic structural diagram of a weak-current unified system for rail transit according to an embodiment of the present disclosure.

In order to resolve the above problem, an embodiment of the present disclosure provides a weak-current unified system for rail transit. As shown in FIG. 2, in the weak-current unified system for rail transit provided in this embodiment, based on systems above a station layer, a weak-current unified cloud platform is built, and field devices of professional systems are independently constructed, so that the weak-current unified system can be simplified into a cloud and end mode. In particular, the station layer, the line control layer, and the road network command layer are constructed in the cloud and end mode, and calculation, storage, and network resources of all systems are managed by the weak-current unified cloud platform in a unified manner.

The weak-current unified cloud platform may communicate with the field devices of the professional systems, to obtain operating data collected by the field devices of the professional systems, and perform at least one of calculation, storage, and transmission on the operating data to determine operating statuses of the professional systems of rail transit; and the weak-current unified cloud platform may further deliver control instructions or files to the field devices of the professional systems to manage and control the professional systems of rail transit through the field devices of the professional systems. Therefore, the weak-current unified system for rail transit is constructed in a cloud and end mode, and a weak-current unified cloud platform is communicatively connected to field devices of professional systems, so that the field devices of the professional systems are managed and controlled in a unified manner. In this way, data interconnection and software and hardware resource sharing between the professional subsystems can be implemented, a joint commissioning cycle of each subsystem is reduced, and a rail transit construction cycle and operating investment costs are reduced, thereby provides conditions for unified dispatching and control of rail transit.

The following describes in detail the weak-current unified system for rail transit in the embodiments of the present disclosure with reference to the accompanying drawings.

FIG. 2 is a schematic structural diagram of a weak-current unified system for rail transit according to an embodiment of the present disclosure.

As shown in FIG. 2, the weak-current unified system for rail transit includes field devices 1 of professional systems and a weak-current unified cloud platform 2.

The field devices 1 of the professional systems may include ground devices of the professional systems and vehicle on-board devices of the professional systems.

In particular, the professional systems may include: a passenger information system (PIS), an AFC system, an ATS system, a CCTV supervisory control system, an ISCS, a power supervisory control and data acquisition (PSCADA), a fire alarm system (FAS), a building automation system (BAS), an enterprise asset management (EAM), a TMS, an office automation (OA) system, and an operating control center (OCC).

The field devices of the professional systems are independently constructed in a traditional manner. Therefore, the field devices in FIG. 2 are ground devices of the professional systems, for example, a signal system field device, a field device of a professional communication subsystem, and field devices of other professional systems, and the other professional systems may be an BAS system, an FAS system, a PSCADA system, an AFC system, a PIS system, and the like.

The ground devices of the professional systems include a CCTV high-definition camera beside the track, an automatic gate machine (AGM) and a ticket vending machine (TVM) of the AFC, a PIS player beside the track, and the like.

The vehicle on-board devices of the professional systems may include a vehicle on-board CCTV high-definition camera, a vehicle on-board PIS player, a multimedia host, and the like.

In particular, the weak-current unified cloud platform 2 may communicate with the field devices 1 of the professional systems, and is configured to obtain operating data collected by the field devices 1 of the professional systems, and perform at least one of calculation, storage, and transmission on the operating data to determine operating statuses of the professional systems of rail transit; and the weak-current unified cloud platform 2 may be further configured to deliver control instructions or files to the field devices 1 of the professional systems to manage and control the professional systems of rail transit through the field devices 1 of the professional systems.

A structure and a function of the weak-current unified cloud platform 2 provided in this embodiment of the present invention is described below with reference to FIG. 3.

Figure 3:
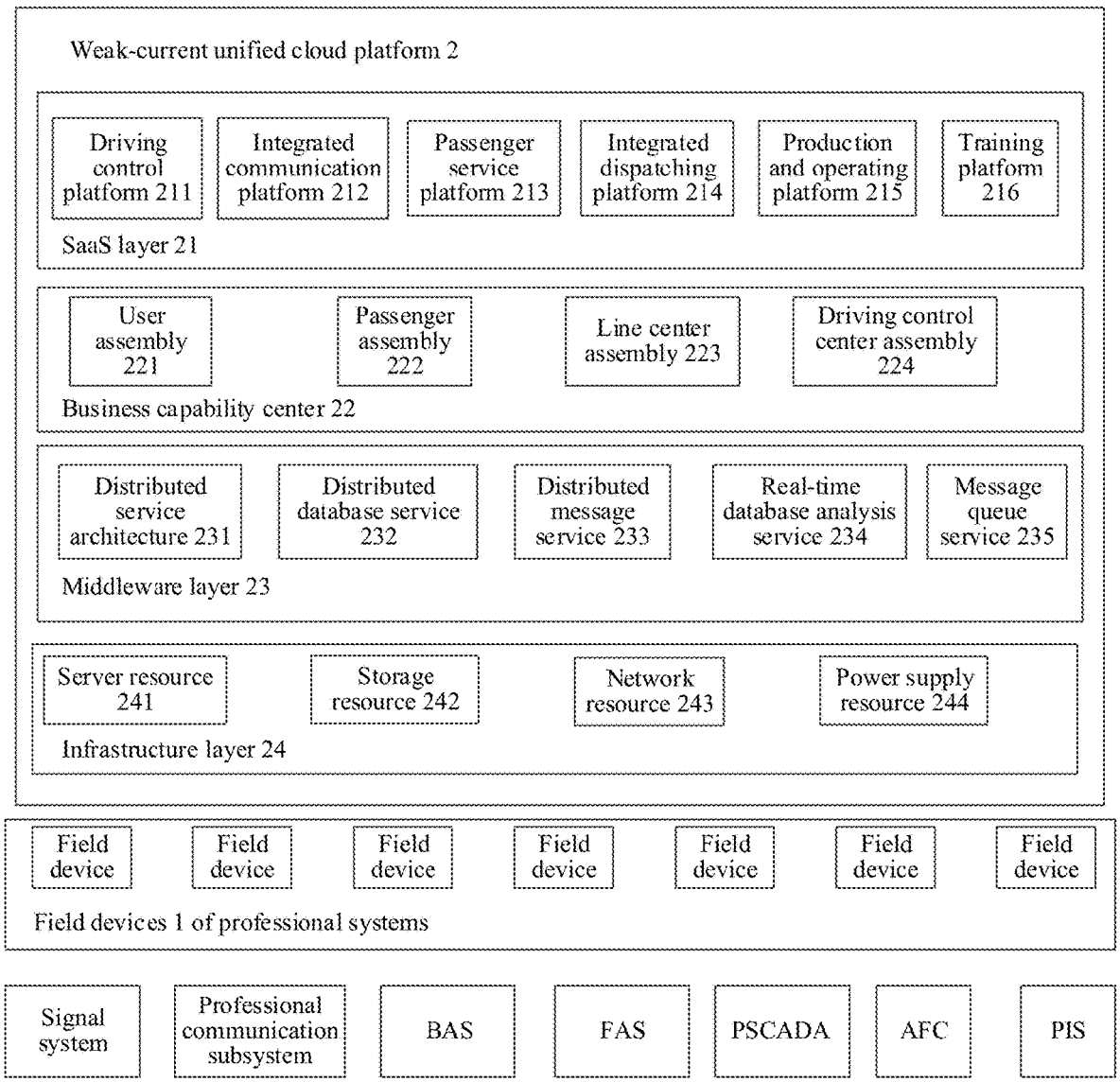
FIG. 3 is a schematic structural diagram of a weak-current unified system for rail transit according to another embodiment of the present disclosure.

In particular, as shown in FIG. 3, the weak-current unified cloud platform 2 includes a SaaS layer 21, a business capability center 22, a middleware layer 23, and an infrastructure layer 24 from top to bottom that are communicatively connected sequentially according to a technical architecture.

During specific implementation, the weak-current unified cloud platform 2 may obtain operating data collected by the field devices 1 of the professional systems through the infrastructure layer 24, and perform at least one of calculation, storage, and transmission on the operating data to determine operating statuses of the professional systems of rail transit; and instructions or files may be sent from the SaaS layer 21 to the field devices 1 of the professional systems by constructing the business capability center 22 and using a middleware messaging mechanism, to manage and control the professional systems of rail transit through the field devices 1 of the professional systems.

Structures and functions of the SaaS layer 21, the business capability center 22, the middleware layer 23, and the infrastructure layer 24 are separately described below.

In particular, the SaaS layer 21 is configured to provide a professional system of rail transit for a user.

The professional systems of rail transit may include a PIS, an AFC, an ATS, a CCTV, an ISCS, a PSCADA, an FAS, a BAS, an EAM, a TMS, an OA, and an OCC.

During specific implementation, as shown in FIG. 3, the SaaS layer 21 may be divided into the following six platforms: a driving control platform 211, an integrated communication platform 212, a passenger service platform 213, an integrated dispatching platform 214, a production and operation platform 215, and a training platform 216 according to business types.

The driving control platform 211 is configured to provide services for the operation and safety of rail transit. For example, professional software such as large-screen software for train operating supervision, operating chart compilation software, train operating control software, and a train dispatching system may be provided for an ATS manager.

The integrated communication platform 212 is configured to implement unified communication integration management, and includes a vehicle-ground wireless integrated bearing subsystem, a voice subsystem, a transmission system integrated bearer, and an integrated network management subsystem.

The passenger service platform 213 is configured to implement unified information management and linkage sharing of a vehicle on-board system and a ground system, and provide a diversified and personalized service platform for a passenger.

The integrated dispatching platform 214 is configured to implement integrated supervisory control on professional systems for each line.

The production and operation platform 215 is configured to implement information management for rail transit.

The training platform 216 is configured to implement integrated training management for the professional systems.

The vehicle-ground wireless integrated bearing subsystem may use a set of wireless private networks such as an LTE-U network to bear communication PIS, CCTV, broadcasting, passenger Internet access, and vehicle-ground communication of a signal vehicle on-board controller in an integrated manner. The voice subsystem may reconstruct a public/dedicated telephone and a dedicated wireless subsystem, use a public network to bear a voice system, and implement unity of voice services through a mature voice over internet protocol (VoIP) technology in the industry. The transmission system integrated bearer may implement logical isolation through a virtual local area network (VLAN) technology to ensure a system security requirement. The integrated network management subsystem may reconstruct the weak-current systems, and integrate centralized alarm functions into an integrated network management system to implement device supervision and unified configuration management of operation management systems.

The training platform 216 may provide a unified training management platform for operators, managers, and repair and maintenance personnel of the professional systems, mainly including a simulation subsystem, a training management subsystem, an online learning platform, and a knowledge management subsystem.

In addition, the business capability center 22 may include a plurality of capability assemblies for implementing different businesses of the weak-current unified cloud platform 2 respectively. For example, a passenger information business, an AFC business, an ATS business, a CCTV supervisory control business, an integrated supervisory control business, a power supervisory control business, a fire alarm business, a building automation business, an asset management business, a training management business, an office automation business, and an operating control business can be implemented.

It can be understood that the business capability center 22 is a core part of the weak-current unified cloud platform 2. The business capability center may adopt an advanced microservice architecture to encapsulate businesses of track production, operating, management, and supervision into individual business capability assemblies and deploy the business capability assemblies on a distributed calculation framework platform.

The microservice architecture is an architecture model in which a single application may be divided into a set of small services, and the services coordinate and cooperate with each other to provide ultimate value for the user. Each service is constructed based on a specific business and the services can be independently deployed to a production environment, a production-like environment, and the like. Each business platform in the SaaS layer can invoke each capability assembly of the business capability center 22 through a unified interface according to business requirements, thereby reducing repeated construction of professional system code.

Although rail transit businesses are complex, the microservice architecture may be used to divide the huge rail transit businesses into a plurality of specific services, to resolve the complexity problem and makes a single service easy to develop, understand, and maintain. In the microservice architecture mode, the services can be independently expanded. For example, when an alarm service capability assembly cannot process data uploaded by a large number of devices, a number of alarm service capability assemblies can be increased to meet a growing number of devices.

In particular, the plurality of capability assemblies of the business capability center 22 may include a user assembly 221, a passenger assembly 222, a line center assembly 223, a driving control center assembly 224, and various other assemblies that can be invoked by business platforms in the upper SaaS layer 21.

In this embodiment of the present invention, the user assembly 221 may provide services such as unified user management, system login, user logout, password modification, role management, authority verification, and behavior audit for the business systems of the weak-current unified cloud platform 2.

The passenger assembly 222 may provide functions such as user registration, self-service, and travel guidance for a passage, and may also provide services such as a passenger information service and a broadcast service for an upper-level system.

Further, the business capability center 22 may further include a ticketing assembly, which can provide services such as unified ticket issuance, sales, and recovery for an upper-level AFC system, and provide services such as passenger flow statistics, ticket clearing, and financial clearing through summary statistics.

An integrated supervisory control assembly may provide real-time data services and historical data services for automation devices such as a BAS, an FAS, a PSCADA, and a screen door for the ISCS in the upper-level integrated dispatching platform 214.

An alarm and fault assembly may collect alarm and fault information of each system and device from each subsystem interface, and provide services such as unified management, analysis, and early warning.

A configuration management assembly may provide unified basic track information services for the business systems of the weak-current unified cloud platform 2, for example, basic information configurations such as city management, line management, station management, vehicle management, schedule management, and a parameter configuration.

A device assembly may perform unified management on professional devices of all lines of rail transit, including device type management, supplier management, device parameter management, and the like.

A resource assembly may provide services such as unified resource file upload, storage, download, management, and backup for the business systems of the weak-current unified cloud platform 2.

A dispatching assembly may implement management and control of an operating train and a signal device, and mainly implement functions such as operating chart compilation, train routing, automatic adjustment of a train operating interval, and operating data recording.

A repair and maintenance assembly may provide a device repair plan, repair and maintenance work order generation, maintenance task execution, work order summary statistics and the like.

An operating assembly may provide reports such as a daily report, a monthly report, a quarterly report, and an annual report and a management function for each station, each vehicle, each line, and each city operating center.

A training assembly may provide functions such as simulation, training management, course management, online learning, and knowledge management for the upper-level training platform 216.

A report assembly may provide a unified report service for the upper-layer system of the weak-current unified cloud platform 2.

An asset assembly may perform life cycle management on all devices of each line through a professional EAM system, and generate a repair and maintenance plan based on a device status.

A CCTV supervisory control assembly may integrate all camera resources on each line of rail transit, and perform unified management, which is convenient for the upper-layer system to supervise, invoke, and control all cameras on each line.

It can be understood that specific business logic of each platform in the SaaS layer 21 may be provided by the bottom-level business capability center 22. For example, the user assembly 221 in the business capability center 22 may provide user data for each business platform of the SaaS layer 21 through a unified interface. All platforms may invoke data from the business capability center 22 through a unified interface, and therefore data formats may be consistent. Because the business capability center 22 is open to all platforms, data can be interconnected in the professional systems to implement data sharing of all business systems.

It should be noted that, when providing data for each platform of the SaaS layer 21, the business capability center 22 may select and provide data according to permission of each platform. Only when a platform of the SaaS layer 21 has permission to invoke data, the data corresponding to the permission is provided for the corresponding platform, thereby ensuring security of the data in the weak-current unified cloud platform 2.

Further, the middleware layer 23 is configured to provide a middleware resource required for operation of the weak-current unified cloud platform 2, such as data storage, distributed calculation, a distributed database, a big data service, a real-time calculation service, a message queue, and a workflow engine.

Middleware is a type of computer software that connects a software assembly to an application, and includes a set of services through which a plurality of pieces of software running on one or more machines can interact through a network.

In particular, the middleware layer 23 may provide a distributed service architecture 231, a distributed database service 232, a distributed message service 233, a real-time database analysis service 234, a message queue service 235, and the like required for operation of the weak-current unified cloud platform 2.

The real-time database analysis service 234 may be based on a streaming big data analysis platform and provide a tool for real-time streaming data analysis on the cloud.

In particular, the message queue service is an important service in the weak-current unified cloud platform 2, and is used to mainly resolve problems of strong coupling of an upper-layer service and a system, asynchronous messaging, and traffic shaving. The message queue service may implement an architecture with high performance, high availability, scalability, and system interface consistency.

Further, the middleware layer 23 may further include a distributed cache service as required, which is used for a memory database service compatible with the Redis communication protocol to meet business demands of high-layer system high read and write performance and fast data access.

An integrated bus service is an open platform for a service application programming interface (API) based on a high-availability distributed technology, and may implement interoperability of services across technology platforms and application systems.

A distributed calculation service may provide diverse application publishing capabilities and lightweight microservice solutions, and can resolve problems of supervision, diagnosis, and high-availability operation and maintenance in the process of application and service management.

It can be understood that the middleware layer 23 provides a unified middleware resource for operation of the weak-current unified cloud platform 2. Therefore, unified data storage, a unified interface assembly, and unified message transferring can be implemented, to implement interconnection and data sharing between the business systems.

During specific implementation, the middleware layer 23 may be further divided into a business support layer and a data layer from top to bottom that are communicatively connected sequentially.

The data layer is configured to provide a data storage service for the weak-current unified cloud platform 2. In particular, when data storage is performed, data storage may be classified into relational data storage, file storage, and big data storage according to different data formats.

Correspondingly, the data layer may be divided into three parts: a distributed database system, big data storage and processing, and distributed file storage. The distributed database system is mainly configured to store structured data of the weak-current unified cloud platform 2, such as user data, ticket data, a passenger card swipe record, and a device status record. The big data storage and processing is mainly used to store a log file, a formatted data file, or a database file stored in a distributed database system from rail transit devices and systems, and big data analysis may also be performed based on the data to generate data value. The distributed file storage is mainly used to store files such as a picture, a log, a document, a video, a software package, and a template generated by the business systems of rail transit.

The business support layer is configured to provide an Internet middleware resource for the weak-current unified cloud platform 2, which may include a workflow engine service, a rule engine service, a message queue service, a search engine service, a distributed cache service, an integrated bus service, a distributed calculation service, a business supervision service, a real-time calculation service, and a security and authentication service.

In particular, the workflow engine service is used to provide a unified workflow engine service for a shared business capability center of the weak-current unified cloud platform 2, such as an information delivery procedure, a plan approval procedure, and a device repair procedure.

The rule engine service is used to provide a unified rule engine service for the shared business capability center of the weak-current unified cloud platform 2. A rule engine can separate a business decision from application code and simplify implementation logic of an upper-layer system.

Message queue middleware is an important assembly in the weak-current unified cloud platform 2, and is used to mainly resolve problems of strong coupling of an upper-layer service and a system, asynchronous messaging, and traffic shaving. The message queue service may implement an architecture with high performance, high availability, scalability, and final consistency.

The search engine service is used to provide a search service for the weak-current unified cloud platform 2. For example, valuable information may be retrieved from each line, each system, and each data storage according to a keyword entered by the user.

The distributed cache service is a memory database service compatible with the Redis communication protocol to meet business demands of high-layer system high read and write performance and fast data access.

An integrated bus service is an open platform for a service application programming interface (API) based on a high-availability distributed technology, and may implement interoperability of services across technology platforms and application systems.

A distributed calculation service may provide diverse application publishing capabilities and lightweight microservice solutions, and can resolve problems of supervision, diagnosis, and high-availability operation and maintenance in the process of application and service management.

The business supervision service may be used to integrate and encapsulate various advanced Internet technology assemblies such as data collection, message channels, real-time calculation, columnar storage, and online reporting, to provide various scene supervision services such as system supervision, passenger flow analysis, and fault prediction for the upper-layer system.

The real-time calculation service may be based on a streaming big data analysis platform and provide a tool for real-time streaming data analysis on the cloud.

The security and authentication service may be used to provide professional security services such as network security, data security, transmission security, and access security for the weak-current unified cloud platform 2.

In addition, the infrastructure layer 24, also referred to as an infrastructure as a service (IaaS), is configured to provide an infrastructure required for operation of the weak-current unified cloud platform 2.

The infrastructure layer may include a server resource 241 such as a central processing unit (CPU), a storage resource 242 such as a memory storage, a network resource 243 such as a switch, and a power supply resource 244 such as a power supply.

In addition, the IaaS may further provide a virtualization service, that is, an IaaS layer, and may further include a virtual machine and an operating system.

During specific implementation, the IaaS layer may integrate and optimize resources of rail transit lines and allocate resources on demand through virtualization, thereby making the most efficient use of infrastructure resources and save costs of the weak-current unified system for rail transit.

It can be learned from the foregoing analysis that in this embodiment of the present disclosure, the weak-current unified system for rail transit is constructed in a cloud and end mode, and the weak-current unified cloud platform 2 is communicatively connected to the field devices of the professional systems, so that the field devices of the professional systems are managed and controlled in a unified manner. In this way, unified infrastructure management and data interconnection between the professional systems are implemented, thereby reducing repeated construction of the professional systems and reducing construction costs of rail transit. In addition, a simple structure of the weak-current unified system for rail transit provides conditions for unified dispatching and control of rail transit.

During actual use, in the weak-current unified cloud platform 2, the professional systems share an infrastructure in the infrastructure layer 24. In order to improve utilization of each infrastructure in the infrastructure layer 24, the weak-current unified cloud platform 2 may configure required infrastructures for each capability assembly and business platform in real time according to an amount of data currently processed by each capability assembly and business platform, thereby ensuring a business requirement of each capability assembly and business platform, and avoiding the waste of infrastructure.

During specific implementation, the weak-current unified cloud platform 2 may allocate corresponding infrastructure resources to different capability assemblies or business platforms in advance, and set corresponding thresholds.

After obtaining data collected by the field device 1 of each professional system, the weak-current unified cloud platform 2 may compare an amount of data collected by the field device 1 of each professional system with a set threshold. When determining that the amount of data collected by the field device 1 of each professional system exceeds the corresponding threshold, the weak-current unified cloud platform 2 automatically expands infrastructure resources of the corresponding capability assembly or business platform. Otherwise, when the amount of data collected by the field device 1 of each professional system is less than the corresponding threshold, the infrastructure resources of the corresponding capability assembly or business platform may be automatically recovered, thereby implementing flexible resource allocation.

When the corresponding infrastructure resources are allocated to the different capability assemblies or business platforms, the same level of infrastructure resources may be allocated to the capability assemblies or business platforms, and the infrastructure resources are adjusted according to processing speeds of the capability assemblies or business platforms; or infrastructure resources allocated to a capability assembly or business platform that processes more data are twice or three times infrastructure resources allocated to a capability assembly or business platform that processes less data. This is not limited in this embodiment.

Correspondingly, thresholds set by different capability assemblies or business platforms may be adaptively set according to allocated infrastructure resources and types of processed data. This is not specifically limited herein.

In other words, the present invention implements flexible resource allocation through threshold configuration. That is, when an amount of data accessed by any capability assembly or business platform increases and is greater than a corresponding threshold, the weak-current unified cloud platform 2 may enter an automatic capacity expansion mechanism to meet a business requirement at any time without additional workload. When the amount of data accessed by any capability assembly or business platform is lower than the threshold, the weak-current unified cloud platform 2 automatically recovers allocated resources to implement fully automatic resource allocation, thereby ensuring that infrastructure resources allocated to each capability assembly increases and decreases as required, making expansion easy in implementation.

It should be noted that, in order to allow the user to access the weak-current unified cloud platform 2 as required, the weak-current unified cloud platform 2 provided in this embodiment of the present invention may further include a portal layer that is communicatively connected to the SaaS layer 21.

In particular, the portal layer is configured to provide an access entrance of the weak-current unified cloud platform 2 for the user, and may include a passenger service portal, a government service portal, and an internal OA portal.

The passenger service portal is configured to provide a passenger information service entrance for a passenger. The government service portal is configured to provide a government service entrance for each government department. The OA portal is configured to provide an OA entrance for a rail transit operation and maintenance manager.

It can be understood that the passenger service portal may provide passenger an information service entrance for a passenger, so that the passenger can access the weak-current unified cloud platform 2 through a mobile phone, WeChat, a web page, and the like for online ticket purchase, travel guidance acquisition, and real-time operation information. The government service portal may provide a government service entrance for each government department, so that a government, a fire department, a public security department, a meteorological department, and the like of each city can access the weak-current unified cloud platform 2 through the government service entrance, to implement data interconnection between a cloud platform and a government agency. The OA portal may provide an OA entrance for a rail transit operation and maintenance manager, to provide services such as news information, an announcement, procedure management, public information, a standard system, and a mail for the operation and maintenance manager.

The weak-current unified cloud platform provided in this embodiment of the present invention relies on a cloud platform architecture system such as virtualization, Internet middleware, and big data, and a business service center based on microservices is built on this basis to provide a unified interface and a data service for the upper-layer professional system of rail transit. Compared with a traditional monolithic architecture system, services in the microservice architecture can be independently deployed and scaled horizontally as required. Therefore, when lines and devices are added, only computing resources such as servers need to be added, and there is no need to modify a software architecture and code. In addition, in the weak-current unified cloud platform 2, integration of hardware and software system resources such as various servers, storages, and networks traditionally distributed in lines makes centralized operation and maintenance possible, thereby effectively reducing the number and costs of operation and maintenance personnel.

It can be learned from the foregoing analysis that in this embodiment of the present disclosure, the weak-current unified system for rail transit is constructed in a cloud and end mode, and the weak-current unified cloud platform is communicatively connected to the field devices of professional systems, so that the field devices of the professional systems are managed and controlled in a unified manner. The following describes a bearing relationship between each service platform and each professional system in the SaaS layer 21 of the weak-current unified cloud platform provided in this embodiment of the present disclosure with reference to FIG. 4.

Figure 4:
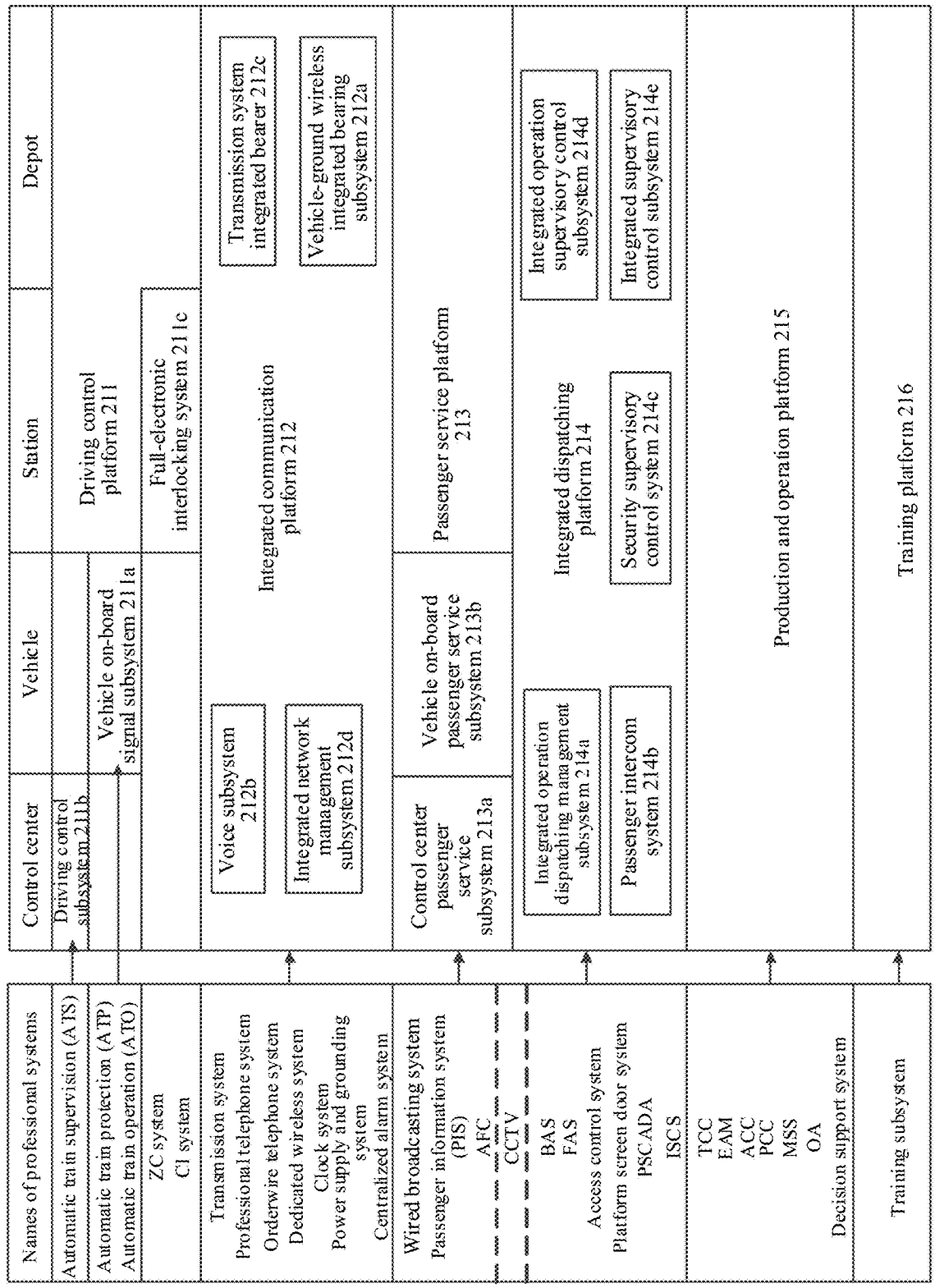
FIG. 4 is a schematic structural diagram of a SaaS layer of a weak-current unified cloud platform according to an embodiment of the present disclosure.

As shown in FIG. 4, the driving control platform 211 may include a vehicle on-board signal subsystem 211a, a driving control subsystem 211b, and a full-electronic interlocking system 211c.

As shown in FIG. 4, the vehicle on-board signal subsystem 211a bears an automatic train protection (ATP) system and an automatic train operation (ATO) system in a converged manner.

The driving control subsystem 211b bears an ATS system, and may be further converged with other weak-current information systems to share data, thereby implementing an intelligent transportation system with the core of driving.

The full-electronic interlocking system 211c bears a zone controller (ZC) and a computer interlocking (CI) system in a converged manner.

Further, as shown in FIG. 4, the integrated communication platform 212 includes a vehicle-ground wireless integrated bearing subsystem 212a, a voice subsystem 212b, a transmission system integrated bearer 212c, and an integrated network management subsystem 212d.

In particular, the vehicle-ground wireless integrated bearing subsystem 212a may use a set of wireless private networks such as an LTE-U network to bear the PIS, the CCTV supervisory control system, and a vehicle on-board controller (VOBC) in an integrated manner.

The voice subsystem 212b is configured to bear voice communication between a dedicated telephone system, an orderwire telephone system, and a dedicated wireless system through a public network. Unity of voice services is implemented through a mature IP telephone or broadband telephone (Voice over Internet Protocol, VoIP) technology in the industry.

The transmission system integrated bearer 212c is configured to implement unified network transmission and isolation of a communication system, a signal system, a weak-current subsystem, including IP unified planning of weak-current subsystems, convergence of transmission networks, unified planning of communication signal networks, and integrated bearing of transmission systems, to implement logical isolation through a VLAN technology to ensure system security requirements.

The integrated network management subsystem 212d is configured to reconstruct network management and centralized alarm systems of the professional systems, to implement unified control of the field devices of the professional systems.

In addition, as shown in FIG. 4, the passenger service platform 213 includes a passenger service subsystem 213a and a vehicle on-board passenger service subsystem 213b of a control center, and is configured to bear the PIS, the CCTV supervisory control system, a public address (PA) and an AFC system for urban rail transit in a converged manner, to provide a diversified and personalized service platform for the user.

The integrated dispatching platform 214 is configured to reconstruct the CCTV supervisory control system, an FAS, a building automation system (BAS), a power supervisory control system (Power Supervisory Control And Data Acquisition, PSCADA), an access control system, a platform screen door system, and an ISCS, to implement integrated supervision and dispatching for the professional systems.

During specific implementation, as shown in FIG. 4, the integrated dispatching platform 214 may be divided into an integrated operation dispatching management subsystem 214a, a passenger intercom system 214b, a security supervisory control system 214c, an integrated operation supervisory control subsystem 214d, and an integrated supervisory control subsystem 214e. Each of the foregoing systems may be disposed in a control center, a vehicle, a station, or a depot as required. For example, the integrated operation dispatching management subsystem 214a and the passenger intercom system 214b are disposed in the control center, the security supervisory control system 214c is disposed in the vehicle and the station, and the integrated operation supervisory control subsystem 214d and the integrated supervisory control subsystem 214e are disposed in the depot. This is not limited in this embodiment.

In particular, in an operation process of rail transit, after determining a driving dispatching plan and a change thereof, the integrated dispatching platform 214 can perform corresponding linkage control on the field devices of the professional systems, thereby implementing rail transit operation dispatching with the core of driving dispatching.

The driving dispatching plan may include information such as a specific train operating time, an operating line, a passing station, and a stopping time. This is not specifically limited in this embodiment.

The driving dispatching plan change is specifically an operation of adjusting information such as the train operating time, the passing station, and the operating line in the driving dispatching plan, which is not specifically limited herein.

In particular, corresponding linkage planning and changing may be performed on the professional systems according to the rail transit driving dispatching plan and change thereof.

For example, if a driving route of a train A in the driving dispatching plan is Beijing-Guangzhou South, a departure time is 12:20, an arrival time is 20:20, and passing stations are Baoding Station, Wuhan, Changsha, and the like, the train A is powered on two hours before the departure, and the professional systems such as the CCTV, the PA, and a network management system (NMS) are started to work, so that before the train A departs, the professional systems are tested and operated to ensure that the train A can depart on time, and reliability of dispatching to the train A is improved.

Taking the ATS as the core of operation dispatching, driving is an initial condition for triggering behaviors of the professional systems to compile a reasonable and efficient operation plan to meet requirements of passengers. Trains are organized for operation to ensure hourly operation of urban rail. Power supply, environmental control, and a disaster prevention device are supervised to ensure safe and reliable operation of rail trains. Networks and devices are managed to keep the devices in good condition and smooth communication. Emergency command is implemented, and emergency incidents are handled, so that an integrated operation dispatching system with the core of driving dispatching is truly implemented.

Further, the integrated dispatching platform 214 may further analyze historical operating data of the professional systems to generate a contingency plan linkage mode. The contingency plan linkage mode includes trigger conditions of the professional systems and corresponding linkage control instructions of the professional systems.

In addition, after the contingency plan linkage mode is generated, real-time data collected by the field devices of the professional systems may be further obtained during the operation of rail transit in this embodiment; it is determined, according to the real-time collected data, whether at least one professional system meets the contingency plan linkage trigger condition; and if yes, linkage control is performed on the at least one professional system according to the corresponding linkage control instruction.

For example, according to an analysis results of the historical operating data of the professional systems, trigger conditions and control instructions corresponding to the professional systems in a generated fire contingency plan linkage mode are: when smoke data collected by an FAS device reaches a first threshold, a fire alarm is triggered and linkage control is performed on a broadcast system for fire emergency broadcasting, and then a CCTV supervisory control system is controlled to play a fire screen, an access control system is controlled to release a controlled door, and a multimedia device at a station is controlled to display fire information to guide passengers to evacuate.

Therefore, during the operation of rail transit, when the smoke data collected by the FAS device reaches the first threshold, the integrated dispatching platform automatically starts the fire contingency plan linkage mode, that is, trigger a fire alarm, and then the broadcast system performs fire emergency broadcasting, the CCTV supervisory control system automatically switches a video surveillance screen to a fire screen, the access control system releases the controlled door according to a fire mode, and the multimedia device at the station is triggered to display fire mode information to guide the passengers to evacuate.

In particular, during actual use, when the integrated dispatching platform is initially created, there is no historical operation data record of each professional system. Therefore, according to the present invention, when a rail transit operation dispatching system is used for the first time, a dispatcher needs to manually handle different operating situations, so that the integrated dispatching platform can record processing operations of the dispatcher on the different operating situations, and then use big data to conduct independent learning according to the recorded processing operations of the dispatcher to generate different contingency plan linkage modes.

After the contingency plan linkage mode is generated, the integrated dispatching platform performs real-time analysis on data collected by the professional systems, and automatically activates the contingency plan linkage mode when determining that any professional system reaches the trigger condition, to operate and dispatch the foregoing professional system automatically by using the contingency plan linkage mode. In this way, operations of operation and maintenance personnel can be reduced, and the professional systems are automatically operated and dispatched according to the contingency plan linkage mode, thereby improving system reliability and safety.

The contingency plan linkage mode may be implemented through a sequence control function of the system, or may be activated and executed automatically or semi-automatically between professional systems, or may be manually executed as a control sequence by a dispatcher, or the like. This is not specifically limited in this embodiment.

Further, as shown in FIG. 4, the production and operation platform 215 is configured to reconstruct a traffic control center (TCC), a clearing center (AFC Cleaning Center, ACC), a precompile control center (PCC), a signaling maintenance support system (MSS), an enterprise asset management (EAM) system, an OA system, and a decision support system, to implement information management for rail transit.

The training platform 216 is configured to reconstruct training subsystems of the professional systems, and may provide a unified training management platform for operators, managers, and repair and maintenance personnel of the professional systems. The training subsystems may be classified into a simulation subsystem, a training management subsystem, an online learning platform, a knowledge management subsystem, and the like as required.

During specific implementation, each of the foregoing business platforms can rely on three networks: a safe production network, an internal service network, and an external service network.

The safe production network is configured to support data transmission of rail transit production and operation systems. For example, the safe production network may support data transmission of systems such as the ATS, the AFC, the PIS, and the ISCS. The internal service network is configured to support data transmission of an internal service system of rail transit. For example, the internal service network may support data transmission of internal service systems such as the internal OA, the training system, and the operation management systems. The external service network is configured to support data transmission of an external service system of rail transit. For example, the external service network may provide external services such as Internet ticket purchasing and travel information query for passengers.

It should be noted that the weak-current unified cloud platform 2 optimizes data storage, business procedures, and management systems by integrating hardware, software, and network resources. OCC-level professional weak-current unified systems of rail transit (such as the AFC, the PIS, and the ISCS) may be provided for lines and stations. In addition, city operation services such as plan management, operation supervision, performance evaluation, emergency handling, and report decision-making may be provided for city-level operation centers by expanding resources such as hardware and software, or national-level operation services are provided for national-level line network operation command centers, real-time overviews of all line operations are displayed, and statistical analysis, evaluation, decision-making, planning, and other services are provided. Therefore, the weak-current unified system for rail transit provided in this embodiment of the present invention is not only applicable to a three-level operation system of a station, a line, and a station in a traditional city, but also applicable to a four-level operation management system across cities.

In addition, rail transit businesses can be rapidly adjusted based on microservices and SaaS. Developers may quickly adjust business logic of each microservice center and quickly perform cloud deployment according to improved requirements.

In a preferred implementation of the present disclosure, the weak-current unified cloud platform may further include a display platform that is communicatively connected to the SaaS layer 21.

In particular, the display platform may obtain operating data of rail transit from each business platform of the SaaS layer 21, and display the data in the display platform according to a preset splicing rule.

In this embodiment, the preset splicing rule may be a default rule in the system, or may be set according to user permission or a user level. This is not specifically limited in this embodiment.

For example, if the user is a security maintenance person, the display platform may display a security maintenance interface to the user after the user logs in to a system according to a permission policy, so that the security maintenance person can consult the security maintenance interface corresponding to his position.

Alternatively, for example, if the user is an international-level user, the display platform may perform data splicing for display according to a national-level user data splicing rule.

Further, each professional system in a human-machine interface provided by the display platform for the user may be a corresponding page that is set separately, so that the dispatcher can enter a system of responsibility by clicking on a professional system page that needs to be browsed or operated, thus making the rail transit operation system more applicable.

In addition, the display platform in this embodiment may be further configured to display guidance information to help a rail transit operator perform a manual operation.

In particular, during normal operation, the rail transit operator can timely and accurately dispatch operations of the professional systems. However, when an emergency such as a fire or a power failure occurs, the operator cannot timely or accurately perform operations due to external factors, resulting in adverse effects. Therefore, in order to avoid the foregoing situation, guidance information is displayed through the display platform in the present disclosure, to guide and help the dispatcher to perform some sequence operations. These sequences include screens and sequence logic to prompt the dispatcher to manually complete a process, or to enable the dispatcher to start an operation sequence to automatically perform a corresponding operation, thereby implementing emergency command and handling emergencies timely and accurately.

In order to prevent the dispatcher from being nervous and triggering some operations by mistake, the display platform further configures an interlock in the display interface to warn or prohibit specified operations, and when the dispatcher needs to take an immediate action, the display platform may automatically pop up a corresponding control sequence, so that the user can directly trigger the control sequence to perform corresponding processing.

If the dispatcher triggers the warning or prohibition of specified operations by mistake when actually triggering the control sequence, the display platform automatically navigates a display screen to a control sequence screen that needs be triggered currently, to ensure higher dispatching safety and reliability. The foregoing screen may be set as the control sequence screen when the alarm occurs, and the operator is required to take an immediate action.

It can be learned from the foregoing analysis that according to the weak-current unified system for rail transit provided in the present disclosure, the transmission subsystem, the professional telephone subsystem, the orderwire telephone subsystem, the dedicated wireless subsystem, the clock subsystem, the power supply and grounding subsystem, the centralized alarm subsystem, and the cable broadcast subsystem, the passenger information subsystem, the video supervisory control system, and the OA system in the traditional communication systems, the ATS, the ATP, the ATO, the ZC, and the CI in the signal system, and weak-current systems such as the AFC, the BAS, the FAS, the access control system, the screen door system, the PSCADA system and the ISCS are constructed in a unified manner by using the weak-current unified cloud platform. In this way, data interconnection and software and hardware resource sharing between the professional subsystems can be implemented, a joint commissioning cycle of each subsystem is reduced, and a rail transit construction cycle and operating investment costs are reduced.

According to the weak-current unified system for rail transit provided in this embodiment of the present disclosure, the weak-current unified system for rail transit is constructed in a cloud and end mode, and the weak-current unified cloud platform 2 is communicatively connected to the field devices of the professional systems, so that the field devices of the professional systems are managed and controlled in a unified manner. In this way, unified infrastructure management and data interconnection between the professional systems are implemented, thereby reducing repeated construction of the professional systems and reducing construction costs of rail transit. In addition, a simple structure of the weak-current unified system for rail transit provides conditions for unified dispatching and control of rail transit.

Figure 5:
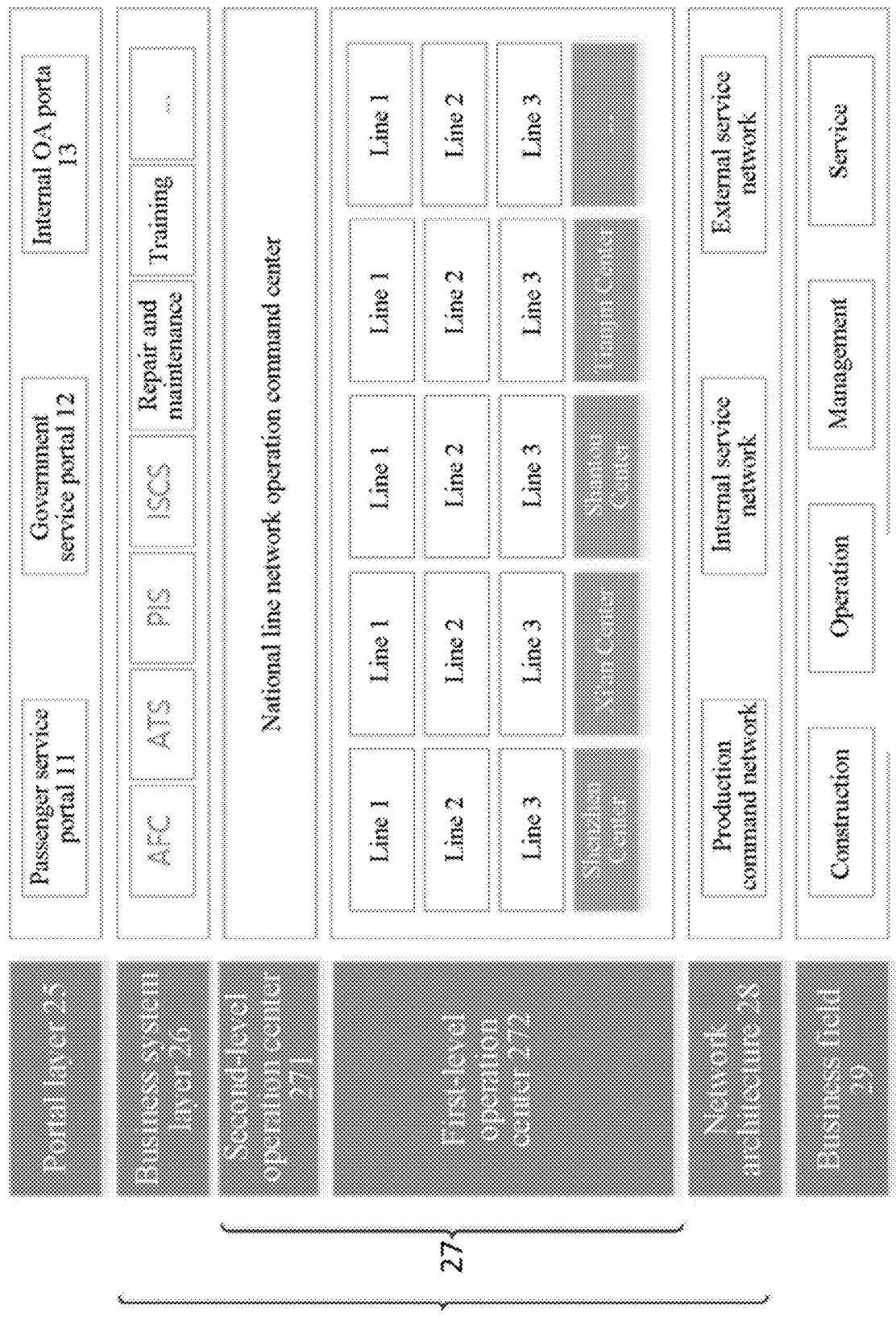
FIG. 5 is a schematic structural diagram of a weak-current unified cloud platform of rail transit according to sill another embodiment of the present disclosure.

In a possible implementation of the present disclosure, the weak-current unified cloud platform 2 may be divided according to business processing logic. As shown in FIG. 5, according to the business logic, the weak-current unified cloud platform 2 may include a portal layer 25, a business system layer 26, an operation layer 27, and a network architecture 28 from top to bottom that are communicatively connected sequentially.

In particular, the business system layer 26 is configured to provide a professional system of rail transit for the user.

It can be understood that the weak-current unified cloud platform 2 may construct the ATS, the AFC, the PIS, the ISCS, the repair and maintenance system, the training system, the operation management system, and the like in a unified manner, and use SaaS to provide professional system services for rail transit lines and cities in a unified manner. Because the professional systems adopt a unified architecture, data interconnection between the professional systems can be implemented.

The network architecture 28 is configured to support data transmission of the weak-current unified cloud platform 2, and may include a safe production network, an internal service network, and an external service network according to service types of transmitted data.

The safe production network is configured to support data transmission of rail transit production and operation systems. For example, the safe production network may support data transmission of systems such as the ATS, the AFC, the PIS, and the ISCS. The internal service network is configured to support data transmission of an internal service system of rail transit. For example, the internal service network may support data transmission of internal service systems such as the internal OA, the training system, and the operation management systems. The external service network is configured to support data transmission of an external service system of rail transit. For example, the external service network may provide external services such as Internet ticket purchasing and travel information query for passengers.

The operation layer 27 is configured to provide a rail transit operation service for the user. According to operation management levels, the operation layer may be further divided into a first-level operation center 272 and a second-level operation center 271.

The first-level operation center 272 is configured to provide a city operation service and a line operation service for a city-level or line-level user. The second-level operation center 271 is configured to integrate operation data of the first-level operation center 272 to provide a national-level operation service for a national-level user.

During specific implementation, the first-level operation center 272 may provide urban operation services such as plan management, operation supervision, performance evaluation, emergency handling, and report decision-making for the city-level user, such as Shenzhen Center, Xi'an Center, and Tianjin Center, and provide line operation services such as the AFC, the PIS, and the ISCS for the line-level user, such as Line 1, Line 2, and Line 3. Therefore, when a new line is put into use, there is no need to purchase hardware devices such as a serve and a storage device nor to mount the professional systems of rail transit, and the hardware devices such as the server and the storage device provided by the weak-current unified cloud platform 2 and the professional systems such as the AFC and the PIS can be used only when a corresponding account is opened on the weak-current unified cloud platform 2, thereby reducing construction costs of the rail transit information system.

The second-level operation center 271 may integrate operation data of the first-level operation center 272, to provide real-time data of integrated cities and line operation centers for a national-level user, display real-time overviews of all lines to the national-level user, and provide statistical analysis, evaluation, decision-making, planning, and other services.

During specific implementation, the weak-current unified cloud platform 2 may provide services for users of different levels, such as a city level, a vehicle level, and a station level. Correspondingly, the display platform may provide different data splicing rules for the users of different levels, and then splice operation data for display by using the different data splicing rules in the display platform, so that the display platform is controlled to provide different display interfaces for the users of different levels.

In addition, as shown in FIG. 5, the weak-current unified cloud platform may further include a business field layer 29 according to business processing logic. Specifically, business fields may be divided into construction, operation, management, and service fields according to types.

It should be noted that the weak-current unified cloud platform 2 optimizes data storage, business procedures, and management systems by integrating hardware, software, and network resources. OCC-level professional information systems of rail transit (such as the AFC, the PIS, and the ISCS) may be provided for lines and stations, city operation services such as plan management, operation supervision, performance evaluation, emergency handling, and report decision-making may be provided for city-level operation centers, and national-level operation services are provided for national-level line network operation command centers, real-time overviews of all line operations are displayed, and statistical analysis, evaluation, decision-making, planning, and other services are provided. Therefore, the weak-current unified cloud platform 2 provided in this embodiment of the present invention is not only applicable to a three-level operation system of a station, a line, and a station in a traditional city, but also applicable to a four-level operation management system across cities.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of the present disclosure.

Any process or method in the flowcharts or described herein in another manner may be understood as indicating a module, a segment, or a part including code of one or more executable instructions for implementing a particular logical function or process step. In addition, the scope of preferred embodiments of the present disclosure include other implementations which do not follow the order shown or discussed, including performing, according to involved functions, the functions basically simultaneously or in a reverse order, which should be understood by technical personnel in the technical field to which the embodiments of the present disclosure belong.

It should be understood that parts of the present disclosure may be implemented by using hardware, software, firmware, or combinations thereof. In the foregoing implementations, a plurality of steps or methods may be implemented by using software or firmware that are stored in a memory and are executed by a proper instruction execution apparatus. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

In addition, functional units in the embodiments of the present disclosure may be integrated into a first processing module, or each of the units may exist alone physically, or two or more units are integrated into one module. The integrated module may be implemented in a hardware form, or may be implemented in a form of a software functional module. If implemented in the form of software functional modules and sold or used as an independent product, the integrated module may also be stored in a computer-readable storage medium.

The aforementioned storage medium may be a read-only memory, a magnetic disk, or an optical disc. Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A weak-current unified system for rail transit, the system comprising:
   field devices of professional systems, and
   a weak-current unified cloud platform,
   wherein the weak-current unified cloud platform communicates with the field devices of the professional systems, and obtains operating data collected by the field devices of the professional systems, and performs at least one of calculation, storage, and transmission on the operating data to determine operating statuses of the professional systems of rail transit;
   wherein the weak-current unified cloud platform delivers control instructions or files to the field devices of the professional systems to manage and control the professional systems of rail transit through the field devices of the professional systems;
   wherein the weak-current unified cloud platform includes a software as a service (SaaS) layer, a business capability center, a middleware layer, and an infrastructure layer from top to bottom that are communicatively connected sequentially according to a technical architecture,
   wherein the weak-current unified cloud platform operates on an infrastructure provided by the infrastructure layer; wherein the middleware layer provides a middleware resource to operate the weak-current unified cloud platform; wherein the business capability center includes a plurality of capability assemblies to respectively implement different businesses of the weak-current unified cloud platform; wherein the SaaS layer provides a professional system of rail transit to a user and includes a driving control platform, an integrated communication platform, a passenger service platform, and an integrated dispatching platform according to business types;
   wherein the driving control platform provides operation and safety services and includes a vehicle on-board signal subsystem, a driving control subsystem, and a full-electronic interlocking system, the vehicle on-board signal subsystem bears an automatic train protection system and an automatic train operation system in a converged manner;
   wherein the driving control subsystem bears an automatic train supervision system; and
   wherein the full-electronic interlocking system bears a zone controller and a computer interlocking system in a converged manner.

2. The weak-current unified system according to claim 1, wherein the field devices of the professional systems comprise ground devices of the professional systems and vehicle on-board devices of the professional systems.

3. The weak-current unified system according to claim 1, wherein the infrastructure layer comprises a server resource, a storage resource, a network resource, and a power supply resource.

4. The weak-current unified system according to claim 1, wherein the middleware layer comprises a business support layer and a data layer from top to bottom that are communicatively connected sequentially,
   the data layer provides a data storage service for the weak-current unified cloud platform; and
   the business support layer provides an Internet middleware resource for the weak-current unified cloud platform.

5. The weak-current unified system according to claim 1, wherein the plurality of capability assemblies of the business capability center comprise a user assembly, a passenger assembly, a line center assembly, a driving control center assembly, a ticketing assembly, an integrated supervisory control assembly, an alarm and fault assembly, a configuration management assembly, a device assembly, a resource assembly, a dispatching assembly, a repair and maintenance assembly, an operating assembly, a training assembly, a report assembly, an asset assembly, and a closed-circuit television (CCTV) supervisory control assembly.

6. The weak-current unified system according to claim 1, wherein the business capability center is a distributed computing framework platform based on a microservice architecture.

7. The weak-current unified system according to claim 1, wherein the SaaS layer further comprises a production and operation platform and a training platform.

8. The weak-current unified system according to claim 7, wherein the production and operation platform reconstructs a traffic control center, a rail transit clearing center, a precompile control center, a signal maintenance support system, an enterprise asset management system, an office automation system, and a decision support system, to implement information management for rail transit.

9. The weak-current unified system according to claim 7, wherein the training platform reconstructs training subsystems of the professional systems to implement integrated training management for the professional systems.

10. The weak-current unified system according to claim 1, wherein the integrated communication platform implements unified communication integration management, and comprises a vehicle-ground wireless integrated bearing subsystem, a voice subsystem, a transmission system integrated bearer, and an integrated network management subsystem, wherein
- the vehicle-ground wireless integrated bearing subsystem bears vehicle-ground communication between a passenger information system, a CCTV supervisory control system, and a vehicle on-board controller in an integrated manner through a wireless private network;
- the voice subsystem bears voice communication between a dedicated telephone system, an orderwire telephone system, and a dedicated wireless system through a public network;
- the transmission system integrated bearer implements unified network transmission and isolation of a communication system, a signal system, a weak-current subsystem; and
- the integrated network management subsystem reconstructs network management and centralized alarm systems of the professional systems, to implement unified control of the field devices of the professional systems.

11. The weak-current unified system according to claim 1, wherein the passenger service platform implements unified vehicle-ground information management and linkage sharing, and comprises:
- a passenger service subsystem and a vehicle on-board passenger service subsystem of a control center, which bears a passenger service information system, the CCTV supervisory control system, a wired broadcasting system, and an automatic fare collection system for urban rail transit.

12. The weak-current unified system according to claim 1, wherein the integrated dispatching platform reconstructs the CCTV supervisory control system, a fire alarm system, a device automation management system, a power supervisory control system, an access control system, a platform screen door system, and an integrated supervisory control system, to implement integrated supervision and dispatching for the professional systems.

* * * * *